(12) United States Patent
Yergenson (10) Patent No.: US 6,567,110 B2
(45) Date of Patent: May 20, 2003

(54) SYSTEM AND METHOD FOR REDUCING HORIZONTAL BANDING AND MISREGISTRATION BETWEEN COLOR PLANES IN A COLOR IMAGE

(75) Inventor: Robin P Yergenson, Eagle, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 302 days.

(21) Appl. No.: 09/756,302

(22) Filed: Jan. 3, 2001

(65) Prior Publication Data

US 2002/0085084 A1 Jul. 4, 2002

(51) Int. Cl.⁷ .................... B41J 2/385; G01D 15/06; G03G 15/01
(52) U.S. Cl. ...................................... 347/115
(58) Field of Search ................. 347/115, 116, 347/129; 399/160, 161, 127

(56) References Cited

U.S. PATENT DOCUMENTS

| | | | | |
|---|---|---|---|---|
| 3,633,183 A | * | 1/1972 | Cobb et al. | |
| 4,907,287 A | * | 3/1990 | Homma et al. | |
| 4,962,981 A | * | 10/1990 | Murakami et al. | |
| 5,995,802 A | * | 11/1999 | Mori et al. | 347/116 |
| 6,346,958 B2 | * | 2/2002 | Kanno | 347/116 |

* cited by examiner

Primary Examiner—Susan S. Y. Lee

(57) ABSTRACT

A system and method are provided for generating a color plane in an image. For example, a noise generation device is coupled to at least one component within a laser imaging assembly to cause a random deviation in the placement of the spots within respective color planes. This random deviation advantageously alleviates the problem of misregistration, white gapping, and moiré patterns, etc. In one embodiment, a system is provided that includes a laser imaging assembly having a laser generating a laser beam that is optically coupled to a photoconductor, typically an organic photoconductive (OPC) drum. The laser beam is optically coupled to a number of predetermined positions on the OPC drum to generate an image on the OPC drum. A noise generator is operatively coupled, for example, to a component in the laser imaging assembly. The noise generator causes a random motion in the component, for example, thereby generating a random deviation of each of the predetermined positions on the OPC drum to which the laser beam is optically coupled.

20 Claims, 6 Drawing Sheets

(Prior Art)

SYSTEM AND METHOD FOR REDUCING HORIZONTAL BANDING AND MISREGISTRATION BETWEEN COLOR PLANES IN A COLOR IMAGE

TECHNICAL FIELD

The present invention is generally related to the field of color printing and, more particularly, is related to a system and method for reducing horizontal banding and misregistration between color planes in a color image.

BACKGROUND OF THE INVENTION

Color printing systems offer new printing capabilities that are changing the way documents are printed. In the past, color printing was only available through printing shops and other entities that could afford prior technologies to create color images. Now, color printers are available that bring color printing to the home of the average individual at reasonable cost. Various technologies are employed to generate color images including ink jet printers. Laser printing technology also offers a promising alternative to ink jet printers, although the current state of laser printing technology is not without problems.

The problems experienced with laser printing technology are related to the internal process of the laser printing technology itself. For example, a typical laser printer generates color images using four colors including cyan, yellow, magenta, and black (CYMK). In order to produce a specific color on a print medium such as, for example, the color purple, a predetermined number of CYMK spots are placed on the print medium next to each other. The print medium may be, for example, paper or other material. The size of each of the CYMK spots is so small that each individual spot is not perceived by the naked eye. That is to say, when viewed by the average individual, the combination of CYMK spots appears as a single color of purple. The many different colors in existence may be generated in this manner.

To place the CYMK spots next to each other, each individual color is placed on the print medium independently of the other colors in so called "color planes". That is to say, each color plane includes all of the spots of one of the CYMK colors of a particular image. In current laser printers, each of the color planes is developed separately and ultimately applied to the print medium either directly or indirectly. At some point, the four color planes are brought together by sequentially placing each of the CYMK colors down on the print medium or on an image transfer belt so that they occupy the same image plane.

Unfortunately, it can be difficult to place each of the CYMK color planes on the same image plane with accurate positioning relative to each other. Specifically, there may be printer structural tolerances, velocity fluctuations, optical imperfections, gear train imperfections and other problems that prevent the various color planes from being placed in an image in perfect relationship to each other. This is generally referred to as misregistration of the color planes. However, the dots are generally accurately placed within the individual color planes relatively to each other.

There are several negative consequences that may result due to the misregistration of the color planes in an image. For example, the shifting of the color planes relative to each other often may result in an undesirable hue shift in the resulting colors. Also, undesirable moiré patterns and white gapping as well as other anomalies may appear in the resulting image that are apparent to the naked eye.

SUMMARY OF THE INVENTION

In light of the forgoing, the present invention provides for a system and method for generating a color plane in an image. According to the present invention, a noise generation device is coupled to at least one component within a laser imaging assembly to cause a random deviation in the placement of the spots within respective color planes. This random deviation advantageously alleviates the problem of misregistration, white gapping, and moiré patterns, etc.

According to one embodiment, a system is provided that includes a laser imaging assembly having a laser generating a laser beam that is optically coupled to a photoconductor, typically an organic photoconductive (OPC) drum. The laser beam is optically coupled to a number of predetermined positions on the photoconductor to generate an image on the photoconductor. A noise generator is operatively coupled, for example, to a component in the laser imaging assembly. The noise generator causes a random motion, for example, in the component, thereby generating a random deviation of each of the predetermined positions on the photoconductor to which the laser beam is optically coupled.

In addition, the present invention includes a method for generating a color plane in an image. The present method comprises the steps of optically coupling a laser beam from a laser to a number of predetermined positions on a photoconductor, and generating a random deviation of each of the predetermined positions.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1A:
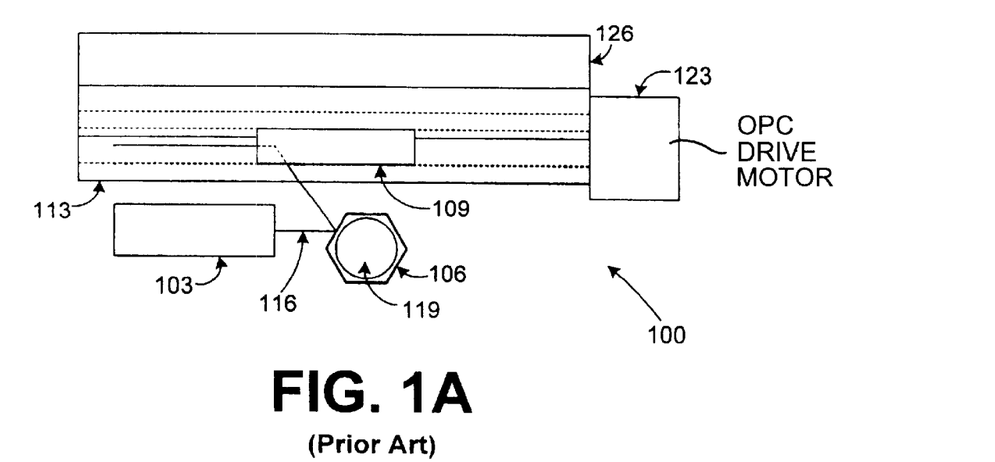
FIG. 1A is a top view of a laser imaging assembly according to the prior art.

With reference to FIG. 1A, shown is a top view of a laser imaging assembly 100 according to the prior art. The laser imaging assembly 100 includes a laser 103, a rotating polygonal mirror 106, a flat mirror 109, and an organic photo-conductive (OPC) drum 113. The laser 103 generates a laser beam 116 that is optically coupled to predetermined positions on the OPC drum 113 as is generally understood by those with ordinary skill in the art. As contemplated herein, optically coupling the laser beam 116 onto the OPC drum 113 includes providing for optical components, etc. that direct the laser beam 116 to the OPC drum 113. In particular, the laser beam 116 bounces off the rotating polygonal mirror 106 to the flat mirror 109. The flat mirror 109 is situated at an angle so that the laser beam 116 is reflected to the OPC drum 113 as shown.

The rotating polygonal mirror 106 rotates at a predetermined speed as driven by a polygonal mirror drive motor 119. As the rotating polygonal mirror 106 rotates, the laser beam 116 is reflected by the flat mirror 109 to scan across the OPC drum 113 in a scan line. When the laser beam 116 falls incident to a particular spot on the OPC drum 113, it leaves photoelectric charges on the spot as is generally known by those with ordinary skill in the art. The OPC drum 113 is rotated by an OPC drive motor 123. A toner cartridge 126 that is situated adjacent to the OPC drum 113 brings toner in contact with the OPC drum 113. The toner electrostatically adheres to the photoelectrically charged spots on the OPC drum 113.

The laser 103 maybe turned on or off and the intensity of the laser beam 116 may be varied accordingly using an appropriate laser beam control signal as is generally understood by those with ordinary skill in the art. In this manner, pixels or spots of a particular image may be created on the OPC drum 113 as the laser beam 116 scans back and forth.

The OPC drum 113 is then brought into contact with a print medium (not shown) and the image is electrostatically transferred to the print medium. The print medium may be, for example, paper or other medium. The print medium is then fed through a toner fusing device that causes the toner to be fused to the print medium, resulting in the final images. The laser imaging assembly 100 is used, for example, to position a single color plane upon a print medium.

Figure 1B:
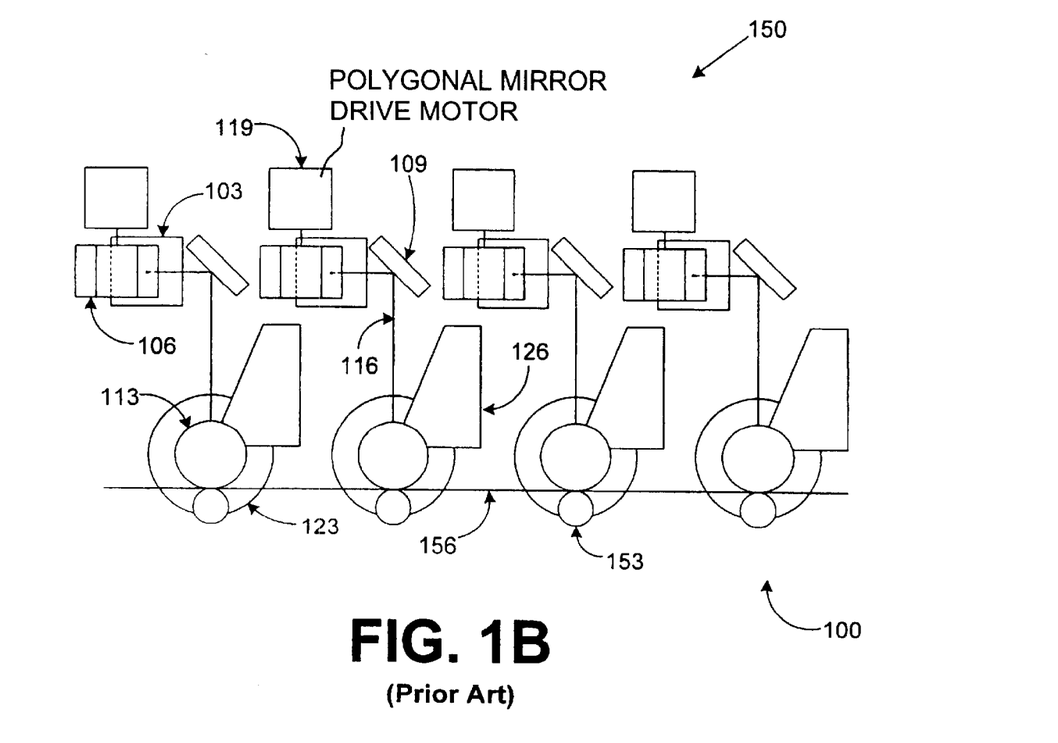
FIG. 1B is a side view of multiple laser imaging assemblies of FIG. 1 that generate multiple color planes.

Turning then to FIG. 1B, shown is a side view of a color imaging assembly 150 that employs four different laser imaging assemblies 100, where each laser imaging assembly 100 is used to place a single color plane into an image that is developed onto a print medium. As shown, each of the laser imaging assemblies 100 also includes a roller 153 that is in contact with the OPC drum 113. A print medium 156 is fed through the rollers 153 and the OPC drums 113 as shown, where the color plane generated by the respective laser imaging assemblies 100 is transferred to the print medium 156.

Figure 2:
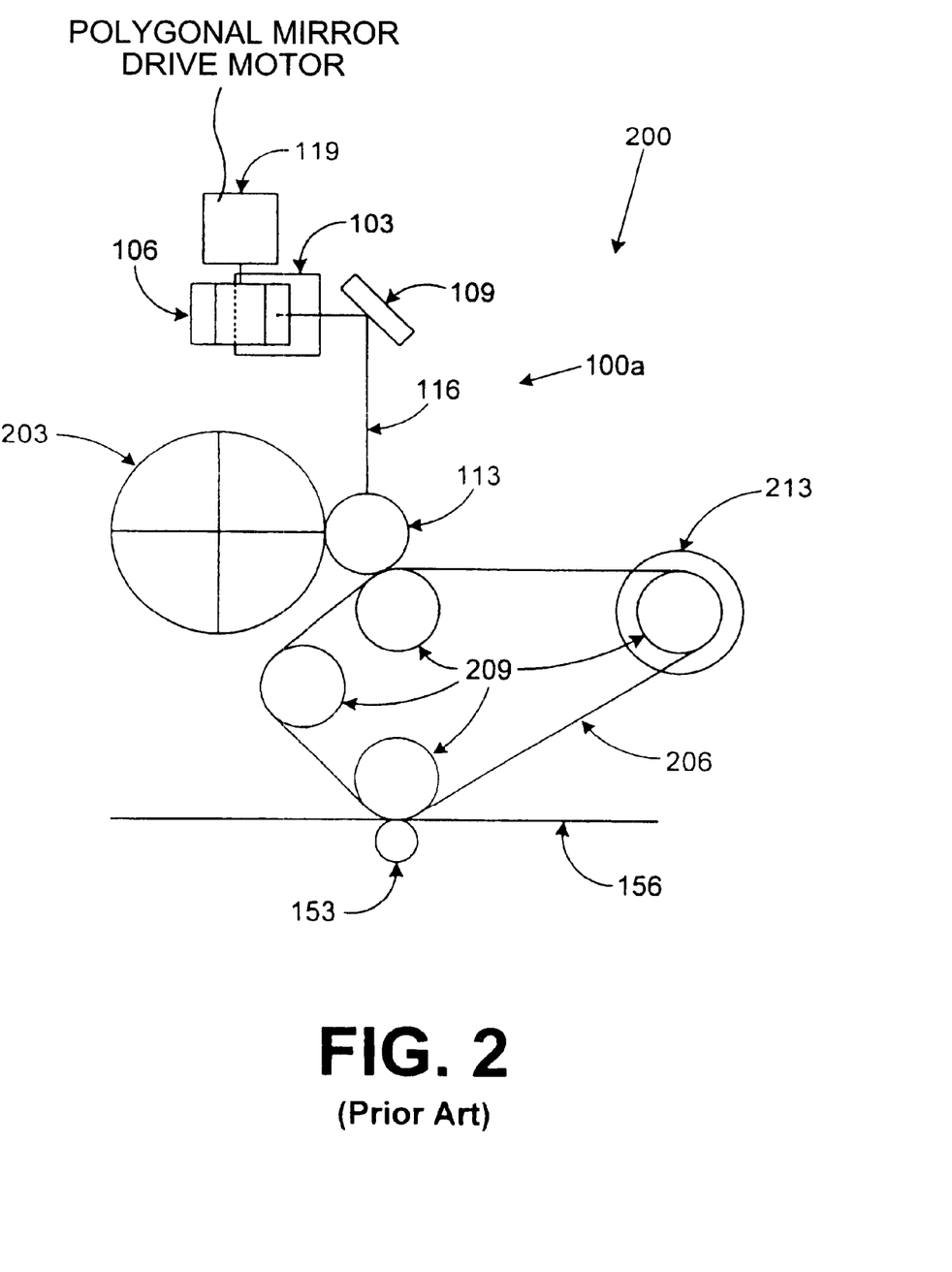
FIG. 2 is a side view of a color imaging assembly according to the prior art.

With reference to FIG. 2, shown is a color imaging assembly 200 according to the prior art. The color imaging assembly 200 includes a laser imaging assembly 100a that includes the laser 103, the rotating polygonal 106, the flat mirror 109, and the OPC drum 113 as shown. The rotating polygonal mirror 106 is driven by the polygonal mirror drive motor 119. The laser imaging assembly 100a of the color imaging assembly 200 differs from the color imaging assembly 100 (FIG. 1B) in that it includes a four color toner cartridge 203 that brings four different color toners separately into contact with the OPC 113 as is generally known by those with ordinary skill in the art. The color imaging assembly 200 also includes an image transfer belt 206 that moves along rollers 209. The image transfer belt 206 is driven, for example, by a transfer belt motor 213.

The color imaging assembly 200 generates complete color images in a manner different than the color imaging assembly 150 (FIG. 1B). Specifically, the color imaging assembly 200 is employed to place all four color planes onto the image transfer belt 206 where the OPC drum 113 comes into contact with all four different colors of toner, namely, for example, cyan, yellow, magenta, and black. The image that is transferred to the image transfer belt 206 is then electrostatically placed on the print medium 156. Thereafter, the print medium 156 is subjected to a toner fusing device that fuses the toner to the print medium as is generally known by those with ordinary skill in the art.

The motors 119, 123, and 213 as well as other motors that may be employed at various points within the color imaging assemblies 150 and 200 may be, for example, stepper motors or other types of motors. Also, the color imaging assemblies 150 and 200 provide two examples of various color imaging assemblies that be employed according to the principles of the present invention. It is understood that there may be other laser color imaging assembly configurations that may be employed within the principles of the present invention as will be discussed.

With reference back to FIG. 1B, next a discussion of the operation of the color imaging assembly 150 is provided. For each of the laser imaging assemblies 100 the rotating polygonal mirror 106 directs the laser beam 116 in scan lines along the OPC drum 113. Specifically, the laser beam 116 emanates from the laser 103 and reflects off both the rotating polygonal mirror 106 and the flat mirror 109 and strikes the OPC drum 113 at predetermined positions along a single scan. As the OPC drum 113 rotates, multiple scans are performed as is known by those with ordinary skill in the art. When the laser beam 116 falls incident to the OPC drum 113, a photoelectric charge is created at the predetermined position on the OPC drum 113 exposed to the light of the laser beam 116. These photoelectric charges are exposed to toner in the toner cartridges 126 and the toner adheres to the photoelectric charge thereby creating the image on the OPC drum 113 with the toner. The toner is transferred to the print medium 156 as it is moved between the OPC drum 113 and the roller 153.

Thus, for each of the laser imaging assemblies 100, there is a rotating polygonal mirror 106 that is driven by the polygonal mirror drive motor 119 and an OPC drive motor 123. To ensure that the color planes created by each of the laser imaging assemblies 100 are positioned correctly with respect to each other in the resulting image on the print medium 156, the rotating polygonal mirrors 106 should be synchronized with each other and the polygonal mirror drive motors 119 should be operated at the same speed or within a predetermined speed tolerance. Also, the OPC drive motors 123 should rotate at the same speed or within a predetermined speed tolerance. It may be possible that a single OPC drive motor 123 be employed for all of the laser imaging assemblies 100 linked by a gear or belt drive, etc.

Even though care is taken to ensure that the color imaging assembly 150 operates within tolerance, typically problems still exist in positioning the color planes relative to each other. Specifically, it is difficult to maintain a constant velocity among all of the laser imaging assemblies 100 in terms of the OPC drum speed 113. Also, it is difficult to maintain proper tolerances in the mechanical devices that make up the laser imaging assemblies 100 so as to ensure reliable performance. These problems and other problems may result in color misregistration, moiré patterns, white gapping and other problems as is generally known by those with ordinary skill in the art.

Referring back to FIG. 2, the operation of the color imaging assembly 200 is discussed. In similar manner to the color imaging assembly 150, the color imaging assembly 200 creates a color image with four different color planes, namely, the cyan, yellow, magenta, and black image planes.

The laser imaging assembly 10a operates in much the same manner as the laser imaging assembly 100 (FIG. 1B). However, a four color toner cartridge 203 is included that imparts the cyan, yellow, magenta, and black toners to the OPC drum 113 as the OPC drum 113 rotates. Each of the CYMK color planes is transferred to the image transfer belt 206 that ultimately receives the full image with the different CYMK color planes. The full image is then transferred to the print medium 156 as is generally understood by those with ordinary skill in the art. However, the color imaging assembly 200 is not without problems. Specifically, speed inaccuracies in the rotational speed of the rotating polygonal mirror 106 and in the polygonal mirror drive motor 119 and the transfer belt motor 213 as well as inaccuracies in the optical components may persist. Also, the tolerances to which the color imaging assembly 200 is constructed may introduce inaccuracy in the placement of the color planes onto the image transfer belt 206 with respect to each other. These inaccuracies often result in color misregistration, moiré patterns, white gapping and other problems as is generally known by those with ordinary skill in the art.

Figure 3:
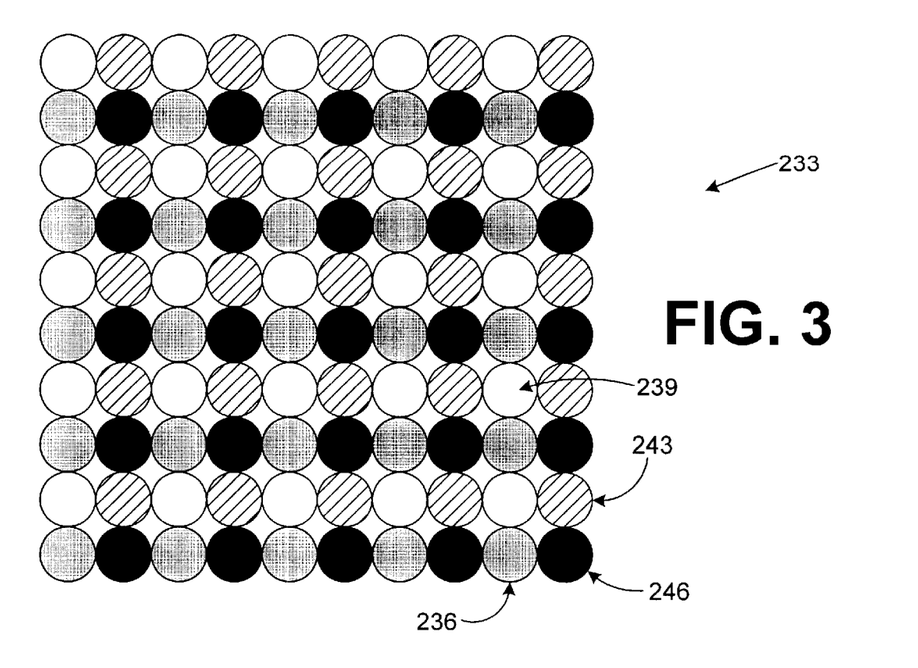
FIG. 3 is a drawing of a number of pixels of a desired image generated from an intersection of multiple color planes.

With reference to FIG. 3, shown is a desired image 233 according to an aspect of the present invention. The desired image 233 represents a magnification of a square portion of a larger image that includes color planes, for example, of cyan spots 236, yellow spots 239, magenta spots 243, and black spots 246. The desired image 233 displays proper placement of all the spots 236, 239, 243, and 246 and, therefore, the respective color planes with respect to each other. Specifically the spots 236, 239, 243, and 246 are evenly spaced and do not overlap each other as the desired image 233 demands. When viewed by the naked eye, the desired image 233 will appear as a specific color with a specific hue as is generally understood by those with ordinary skill in the art. Note that the desired image 233 is provided only for purposes of illustration of the principles of the present invention. It is understood that other configurations may be created in which the spots 236, 239, 243, and 246 are of different sizes or that some spots may not be employed altogether, etc.

Figure 4:
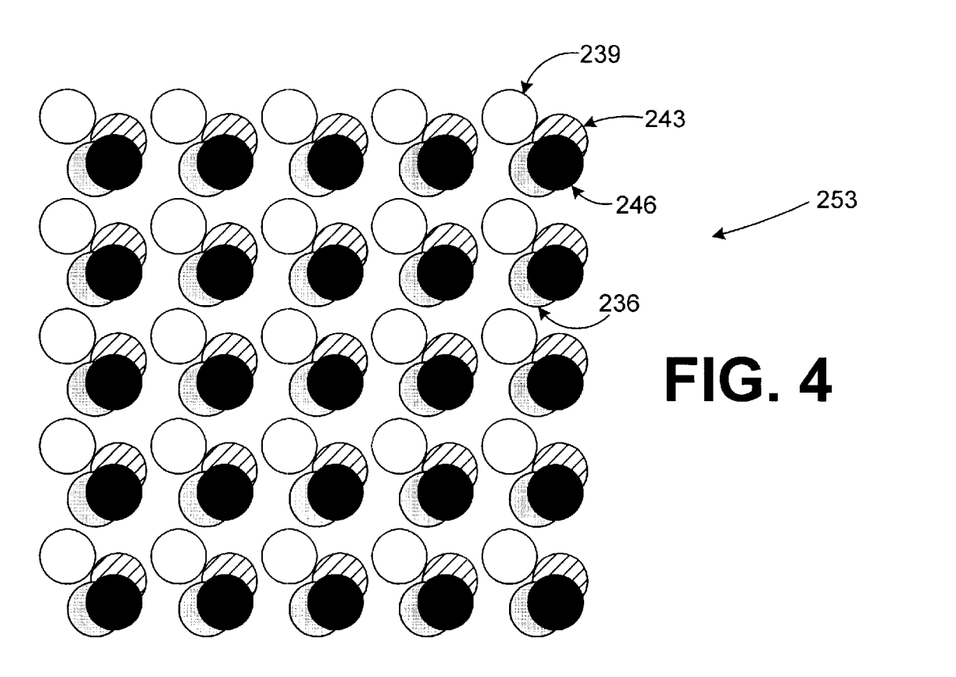
FIG. 4 is a drawing of the number of pixels in a pattern generated by the laser imaging assemblies of FIGS. 1B and 2.

With reference to FIG. 4, shown is a faulty image 253, which illustrates the problem of color misregistration as discussed previously. As seen, each color plane of the respective spots 236, 239, 243, and 246 is shifted relative to the image shown with respect to FIG. 3. The image 253 thus illustrates the misregistration that may occur due to the imperfections in the laser imaging assemblies 100 and 100a. As a result, moiré patterns and white gapping may be observed that negatively affect the overall image created. For example, hue shifts may occur or other problems that seem unnatural, etc.

Figure 5A:
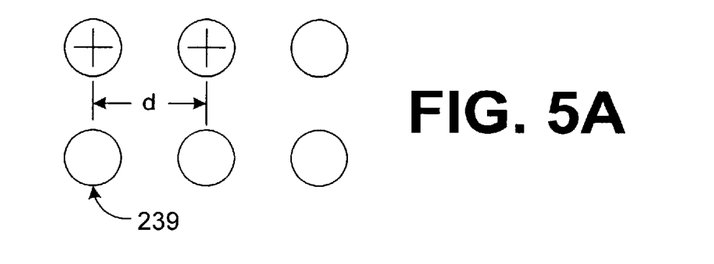
FIG. 5A is a drawing that illustrates a pixel spacing according to an aspect of the present invention.
Figure 5B:
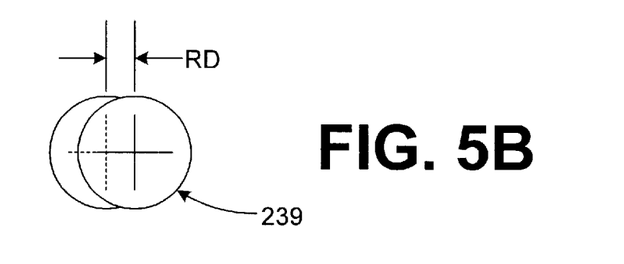
FIG. 5B is a drawing of a random deviation of a pixel or spot location according to an aspect of the present invention.

With reference to FIGS. 5a and 5b, shown are drawings of a few of the yellow spots 239 arranged in such a manner so as to illustrate various principles of the present invention. With respect to FIG. 5a, the spots 239 are equidistant apart. Specifically, the spots 239 are separated by a distance d from center to center as shown.

According to the present invention, a noise generation device is coupled to at least one component within the laser imaging assemblies 100 and 100a to cause a random deviation in the placement of the spots 236, 239, 243, and 246 (FIG. 3) within their respective color planes. This random deviation alleviates the problem of misregistration, white gapping, and moiré patterns as was discussed previously. With reference to FIG. 5b, shown is a random deviation RD that may be any distance that is less than the distance d (FIG. 5a). To alleviate the problems of misregistration, the random deviation RD may be, for example, within a range from about zero to about 25 percent of the distance d, although other random deviations RD may be employed.

Figure 6:
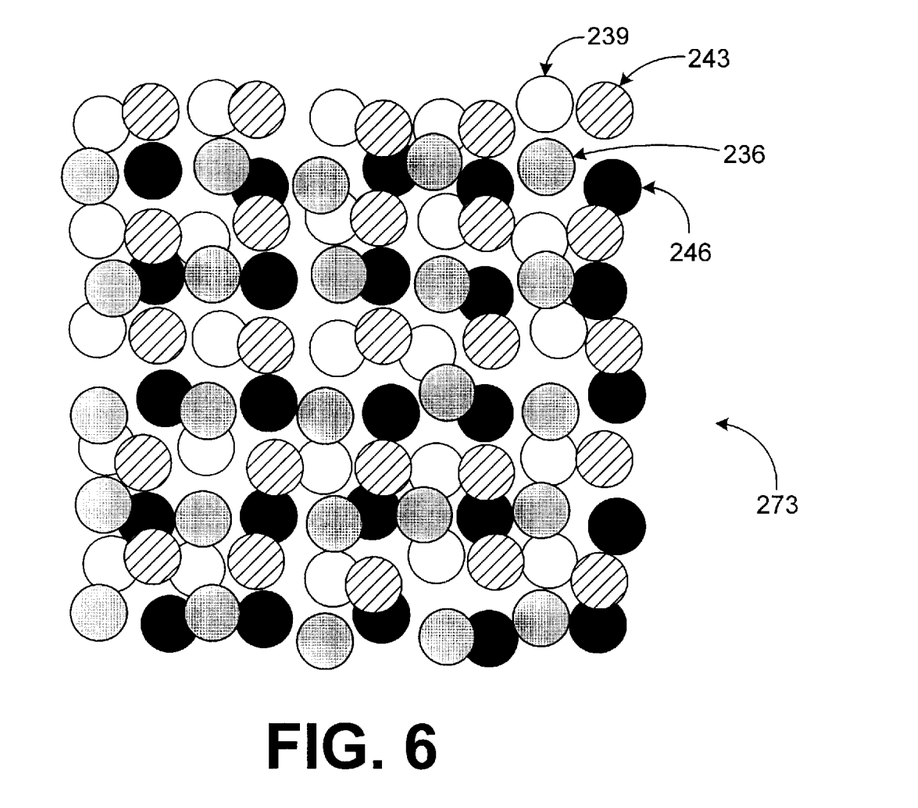
FIG. 6 is a drawing of a number of pixels generated by a laser imaging assembly according to the present invention.

With reference then to FIG. 6, shown is an image 273 that is generated according to the principles of the present invention. In the image 273, the random deviation RD has been applied to each one of the spots 236, 239, 243, and 246 within each of their respective color planes. Due to the randomization of the placement of the spots 236, 239, 243, and 246 relative to each other, the problem of misregistration that results in white gapping and/or moiré patterns is reduced or eliminated.

Figure 7A:
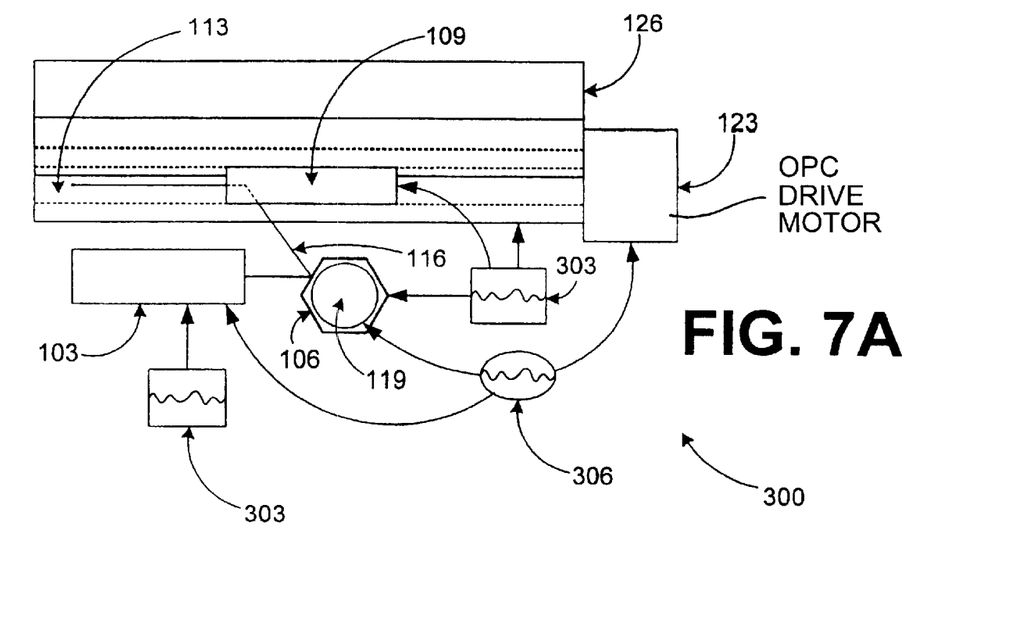
FIG. 7A is a top view of a laser imaging assembly according to an embodiment of the present invention.

With reference to FIG. 7a, shown is a laser imaging assembly 300 according to the present invention. The laser imaging assembly 300 includes one or more noise generators that are operatively coupled to the various components in the laser imaging assembly 300 to cause a random motion to the respective components that ultimately results in the random deviation of the spots 236, 239, 243, and 246 (FIG. 6). The noise generators may be, for example, a mechanical noise generator 303, an electrical noise generator 306, or other noise generation device. The mechanical noise generators 303 may be, for example, vibration machines, vibrators, or other mechanical and or electromechanical devices that generate vibrations according to various principles.

Figure 7B:
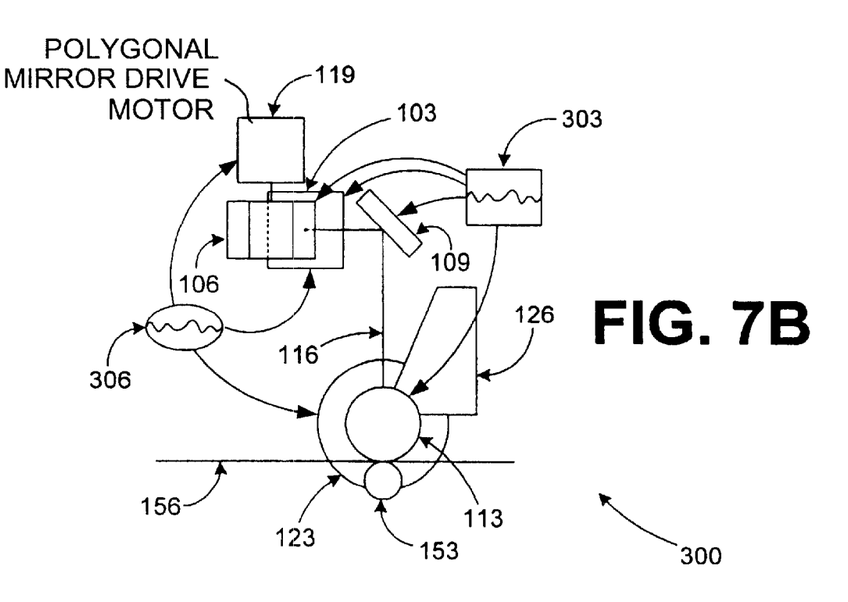
FIG. 7B is a side view of the laser imaging assembly of FIG. 7A.

The electrical noise generator 306 is essentially a noise signal generator that generates an electrical signal of random noise that is added, for example, to the drive signals of the respective motors 119 and 123 or other motors employed in the laser imaging assembly 300. The random noise may be used to modulate a control signal applied to the laser 103. The noise signal generator 306 may be, for example, a random signal generator or other such devices that can provide a noise signal according to the present invention. FIG. 7b shows a side view of the laser imaging assembly 300.

Figure 8:
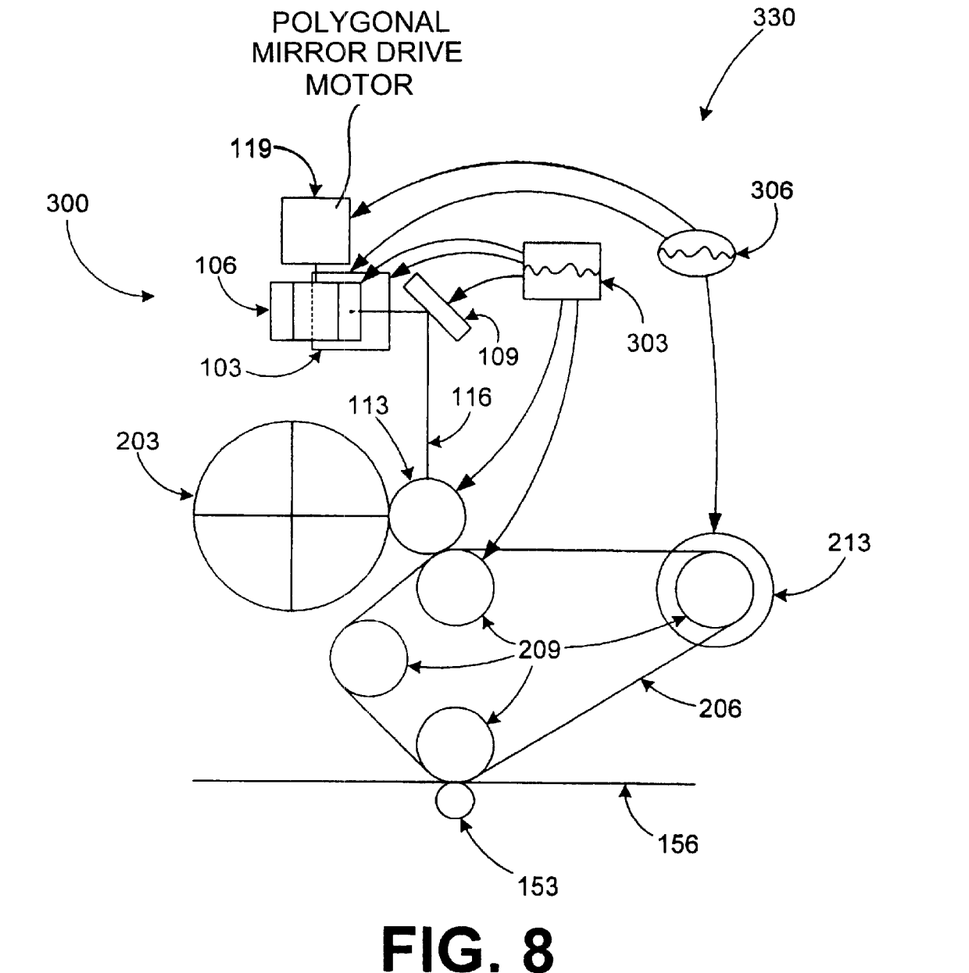
FIG. 8 is a side view of a color imaging assembly according to another embodiment of the present invention.

With reference to FIG. 8, shown is a color imaging assembly 330 that includes the mechanical and electrical noise generators 303 and 306. The mechanical and electrical noise generators 303 and 306 are operatively coupled to the various components of the color imaging assembly 330 as shown. The noise generators 303 and 306 introduce random motion similar to shaking, for example, to the component to which they are applied. Specifically, the mechanical noise generator 303 may be applied, for example, to any one or more of the laser 103, the rotating polygonal mirror 106, the stationary mirror 109, the OPC drum 113, and the rollers 209.

The random motion created in one or more of these components results in the random deviation of the positions of the spots 236, 239, 243, and 246 (FIG. 6) within their respective color planes. For example, the random motion may alter an optical pathway of the laser beam 116 such would be the case if the random motion occurred, for example, in the laser 103, stationary mirror 109 or the rotating polygonal mirror 106. The random motion may also alter the position of the OPC drum 113 with respect to the laser beam 116.

Likewise, the electrical noise generator 306 may be employed to generate a noise signal that is added to a drive signal applied to the motors 119 and 213 or other motors employed in the laser imaging assembly 300. The added noise signal introduces random fluctuation in the speed of the motors 119 and 213 similar to stuttering or shaking. This random fluctuation in speed also results in the random deviation of the positions of the spots 236, 239, 243, and 246 within their respective color planes. For example, random fluctuation in the speed of the polygonal mirror drive motor 119 causes corresponding fluctuation in the speed of the rotating polygonal mirror 106. This ultimately causes fluctuation in the optical pathway of the laser beam 116. Also, random fluctuation in the speed of the OPC drive motor 123 causes movement in the OPC drum 113 relative to the laser beam 116. Note that the electrical noise generator 306 maybe applied to other motors that drive the various other components such as the OPC drum 113.

In addition, the electrical noise generator 306 may be employed to modulate a control signal applied to the laser 103 in the laser imaging assembly 300 (FIG. 7B) and/or the color imaging assembly 330. Such a control signal generally is used to control the operation of the laser 103 as is generally known by those with ordinary skill in the art. The use of the electrical noise generator 306 to modulate the control signal results in a random deviation in the placement of the spots 236, 239, 243, and 246 onto the OPC drum 113 as illustrated with respect to FIG. 6. Specifically, the timing of the pulsing of the laser beam 116 may be varied so that the spots 236, 239, 243, and 246 are placed in positions with a random deviation RD.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A system for generating a color plane in an image, comprising:
    a laser imaging assembly having a laser generating a laser beam that is optically coupled to a photoconductor, wherein the laser beam is optically coupled to a number of predetermined positions on the photoconductor; and
    a noise generator operatively coupled to the laser imaging assembly to generate a random deviation of each of the predetermined positions.

2. The system of claim 1, wherein the laser imaging assembly further comprises a stationary component, the noise generator being mechanically coupled to the stationary component, wherein a random mechanical motion imparted onto the stationary component alters an optical pathway of the laser beam.

3. The system of claim 1, wherein the noise generator further comprises a noise signal generator that alters a drive signal of a polygonal mirror drive motor that drives a rotating polygonal mirror in the laser imaging assembly, thereby altering an optical pathway of the laser beam.

4. The system of claim 1, wherein the noise generator further comprises a noise signal generator that modulates a control signal applied to the laser.

5. The system of claim 1, wherein the noise generator further comprises a noise signal generator that alters a drive signal applied to a photoconductor drive motor that drives the photoconductor, thereby causing the random deviation.

6. The system of claim 2, wherein the stationary component further comprises a flat mirror that partially defines an optical pathway from the laser to the photoconductor, wherein the noise generator is mechanically coupled to the flat mirror.

7. The system of claim 2, wherein the noise generator further comprises a vibrator.

8. A system for generating a color plane in an image, comprising:
    a laser imaging assembly having a laser generating a laser beam that is optically coupled to a photoconductor, wherein the laser beam is optically coupled to a number of predetermined positions on the photoconductor; and
    noise generation means for generating a random deviation of each of the predetermined positions.

9. The system of claim 8, wherein the noise generation means further comprises means for generating a random mechanical motion in a stationary component in the laser imaging assembly, thereby altering an optical pathway of the laser beam.

10. The system of claim 8, wherein the noise generation means further comprises means for randomly altering a speed of a rotating polygonal mirror in the laser imaging assembly, thereby altering an optical pathway of the laser beam.

11. The system of claim 8, wherein the noise generation means further comprises means for modulating a control signal applied to the laser.

12. The system of claim 8, wherein the noise generation means further comprises means for randomly altering a speed of the photoconductor, thereby causing the random deviation.

13. The system of claim 9, wherein the stationary component further comprises a flat mirror that partially defines an optical pathway from the laser to the photoconductor, wherein the noise generation means is mechanically coupled to the flat mirror.

14. The system of claim 9, wherein the noise generation means further comprises a vibrator.

15. A method for generating a color plane in an image, comprising the steps of:
    optically coupling a laser beam from a laser to a number of predetermined positions on a photoconductor; and
    generating a random deviation of each of the predetermined positions.

16. The method of claim 15, further comprising wherein the step of generating the random deviation of each of the predetermined positions further comprises the step of altering an optical pathway of the laser beam.

17. The method of claim 15, wherein the step of generating the random deviation of each of the predetermined positions assembly further comprises the step of randomly altering a speed of a rotating polygonal mirror in the laser imaging assembly, thereby altering an optical pathway of the laser beam.

18. The method of claim 15, wherein the step of generating the random deviation of each of the predetermined positions further comprises the step of randomly altering a speed of the photoconductor, thereby causing the random deviation.

19. The method of claim 15, further comprising the step of partially defining an optical pathway from the laser to the photoconductor with a flat mirror; and
    wherein the step of generating the random deviation of each of the predetermined positions further comprises the step of generating a random motion in the flat mirror.

20. The system of claim 15, wherein the step of generating the random deviation of each of the predetermined positions further comprises the step of generating a vibration in a component in the laser imaging assembly.

* * * * *